Feb. 22, 1966  W. C. BELK  3,236,175
APPARATUS FOR SEPARATING LIQUID FROM SOLID MATERIAL
Filed June 29, 1964  2 Sheets-Sheet 1
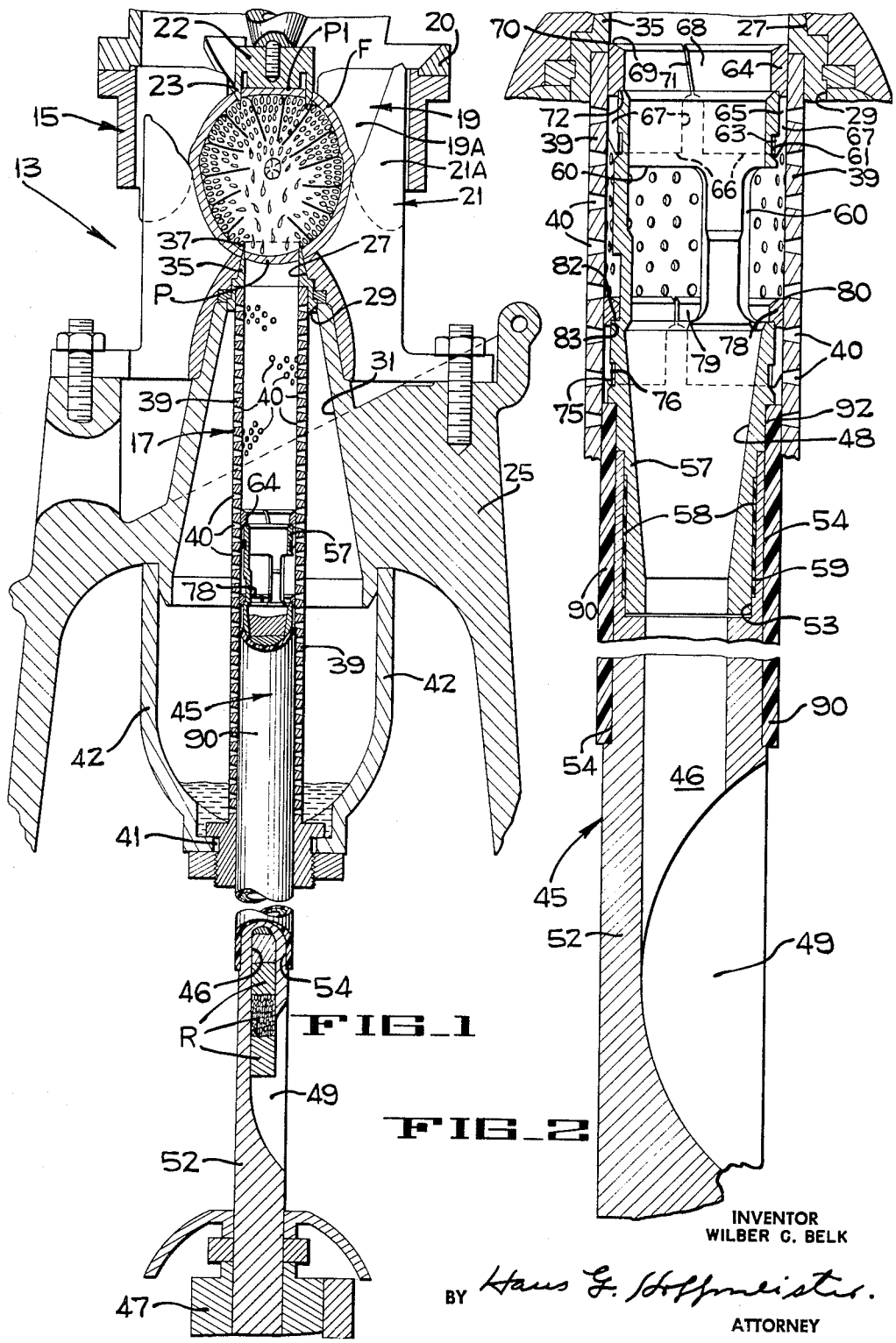
FIG_1
FIG_2
INVENTOR
WILBER C. BELK
BY Hans G. Hoffmeister
ATTORNEY

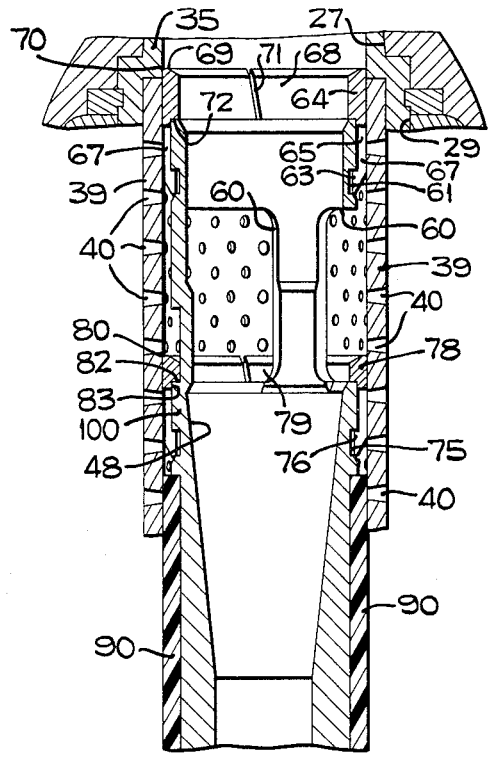
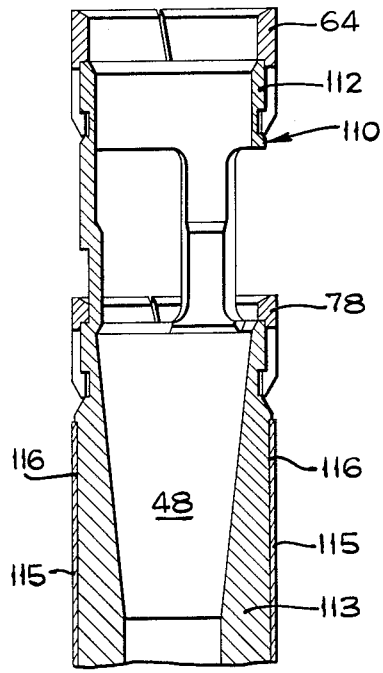
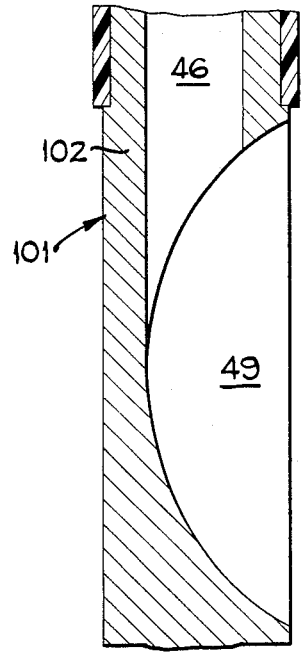
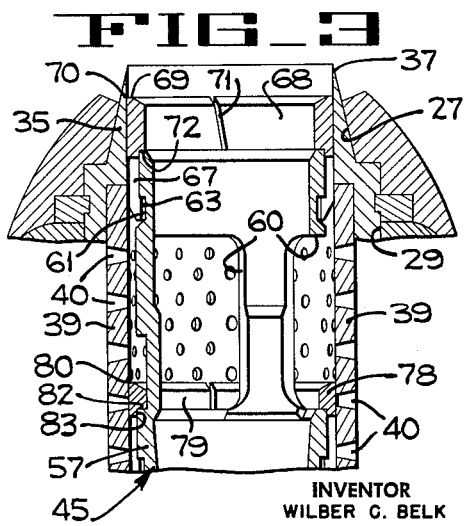
FIG_4
FIG_5
FIG_3
INVENTOR
WILBER C. BELK
BY Hans G. Hoffmeister
ATTORNEY

United States Patent Office 3,236,175
Patented Feb. 22, 1966

3,236,175
APPARATUS FOR SEPARATING LIQUID
FROM SOLID MATERIAL
Wilber C. Belk, Lakeland, Fla., assignor to FMC Corporation, San Jose, Calif., a corporation of Delaware
Filed June 29, 1964, Ser. No. 378,907
10 Claims. (Cl. 100—108)

This invention pertains to apparatus for separating liquid from solid material and more particularly concerns an improved plunger for expelling liquid from solid material and directing it radially outwardly through a tubular strainer in which the plunger reciprocates.

In separating apparatus of the type disclosed in the patent to Belk, No. 2,856,846, a tubular plunger or orifice tube is arranged to reciprocate in a tubular strainer with which it has a close sliding fit. Due to the necessity of maintaining this sliding contact, both the plunger and the screen are subject to considerable wear. Also, this type of plunger has a solid or imperforate upper wall, and it has been found that such plungers restrict the radial outward movement of liquid toward the screen to a considerable degree.

Accordingly, it is an object of the present invention to provide an improved plunger and strainer mechanism for a liquid separating mechanism.

Another object is to provide a plunger construction that has long-wear qualities, and will not restrict the movement of liquid through the strainer.

Another object is to provide a plunger construction having a minimum of high-wear parts all of which may be quickly and easily replaced without requiring replacement of the low-wear parts.

Other and further objects and advantages of the present invention will be apparent from the following description taken in connection with the accompanying drawings in which:

FIGURE 1 is a fragmentary vertical section of a citrus fruit juice extracting mechanism having the plunger of the present invention incorporated therein.

FIGURE 2 is an enlarged fragmentary vertical section of the mechanism of FIGURE 1, showing the plunger in a different operating position within the tubular strainer.

FIGURE 3 is an enlarged fragmentary section similar to FIG. 2 showing the plunger in its uppermost position in the strainer tube.

FIGURES 4 and 5 are enlarged fragmentary sections, similar to FIG. 2, but showing two other embodiments of the plunger of the present invention.

The separating mechanism of the present invention is illustrated in FIG. 1 in connection with a citrus fruit extracting mechanism 13 of the type described in the U.S. patent to Hait No. 2,649,730 and in the U.S. patent to W. C. Belk et al. No. 2,780,988. Only those portions of the entire juice extractor mechanism 13 that are necessary for a complete understanding of the present invention have been shown herein, it being understood that reference may be had to the above-mentioned patents, which are incorporated by reference herein, for a complete description of any structure or operation not described in detail in the present specification.

The citrus fruit juice extractor 13 (FIG. 1) comprises an upper, whole fruit squeezing mechanism 15 and a co-operating juice separating apparatus 17, embodying the present invention, positioned therebelow. The fruit squeezing mechanism 15 comprises a pair of cups 19 and 21, each of which is provided with a plurality of spaced blades or fingers 19A and 21A respectively. The upper digitated cup 19 is secured, in a downwardly facing position, to a vertically reciprocable head 20 which also carries a cutter assembly 22 that has a downwardly directed circular blade 23. The upper cup 19 is mounted for reciprocating, vertical movement into and out of interdigitation with the upwardly projecting blades 21A of the lower cup 21 which is rigidly supported on a stationary bedplate 25 in an upwardly facing position and in vertical alignment with the upper cup 19. The lower cup 21 and the bedplate 25 are provided with vertically aligned apertures 27 and 29, respectively, which communicate with a frusto-conical chamber 31 formed in the bedplate 25. A tubular knife 35 fits tightly within the apertures 27 and 29 and has an annular blade 37 that extends upwardly beyond the aperture 27 into the cavity of the lower cup 21. The knife 35 abuts the upper end of a cylindrical strainer tube 39 which is axially aligned with the apertures 27 and 29 and with the knife 35. The strainer tube 39 forms a part of the juice separating apparatus 17 and has a multiplicity of small perforations 40 provided in the upper portion of its wall. The tube 39 is removably fastened in an aperture 41 provided in the bottom of a juice collecting sump 42 that is secured in sealed relation to the wall defining the lower end of the chamber 31.

The strainer tube 39 slidably receives a pressure exerting member in the form of an elongated cylindrical plunger or orifice tube 45 that is fastened in an upwardly extending position to a crosshead 47, only a fragment of which is shown. The crosshead 47 is operatively connected with the upper cup supporting head 20 for vertical reciprocation in timed relation therewith, in a manner not herein shown but fully disclosed in the above-mentioned Belk et al. Patent No. 2,780,988. The plunger 45 (FIG. 2) is provided with an axial passage 46 which communicates with the interior of the strainer tube 39 through an upwardly flaring mouth 48 in the upper end of the plunger. The lower end of the axial passage 46 communicates with a longitudinal slot 49 milled in the side of the plunger 45 adjacent its point of attachment to the crosshead 47.

The window-type orifice tube 45 (FIG. 2) comprises a body portion 52 having an annular stepped recess 53 formed in its inner surface and an annular recess 54 in its outer surface at the upper end thereof. A window insert 57 is secured in the upper end of the body portion 52 by means of a suitable epoxy resin adhesive 58 disposed between a lower reduced diameter portion 59 of the insert 57 and the walls defining a portion of the recess 53. The adhesive may be of the type marketed by Shell Chemical Co. under the name Epon Adhesive VIII which is prepared by adding Epon Curing Agent A. The window insert 57 is a generally tubular member having three cut-out portions 60, only two being shown in FIG. 2, which define windows or passages through which fluid can pass outwardly to the strainer tube 39.

At its upper end, the window insert 57 is provided with an annular groove 61 which receives a substantially cylindrical flange 63 in the lower portion 65 of a split ring 64. The portion 65 of ring 64 is made up of four segments 66 separated by slots 67, said four segments having the composite, substantially cylindrical, inwardly facing flange 63 formed integral therewith. The ring 64 also has an upper, generally cylindrical portion 68 which is provided with a flat annular top surface area 69 that cooperates with the cylindrical side wall to provide a circular cutting edge 70. The outer surface of the upper portion 68 is disposed in close, sliding engagement with the inner surface of the strainer tube 39. A slot 71 extends through the upper portion 68 of the ring and communicates with one of the slots 67 in the lower portion 65. The extreme upper edge of the window insert 57 is disposed in snug, supported engagement in a recess 72 in the upper portion 68 of the ring 64.

At a point intermediate its length, the insert 57 is provided with a second groove 75 which receives a lower, generally cylindrical, composite flange 76 of a lower split ring 78 which is substantially identical to the upper ring 64 except that the axial length of the upper cylindrical portion 79 of lower ring 78 is somewhat less than the axial length of the upper portion 68 of upper ring 64. A circular cutting edge 80 is formed on the upper edge of ring 78 by the intersection of an annular top surface area and the cylindrical side wall, and a shoulder 82 on the window insert 57 is disposed in a recess 83 of the lower ring 78 to support the ring.

A bearing sleeve 90 is disposed at its lower end portion in the recess 54 in the body portion 52 of the tube 45 and, at its upper end, in a recess 92 in the insert 57. The sleeve 90 is made of a graphite-bearing plastic material marketed by W. S. Shamban & Co., of Culver City, California under the name of Teflon Compound #16849. This sleeve may also be made of an elastic, corrosion resistant plastic such as polytetrafluoroethylene resin, sold under the trademark "Teflon," said plastic having particles therein. Since the sleeve is tightly held in the orifice tube 45, it moves up and down with the tube and slides along the inner surface of strainer 39 with a clearance of one or two thousandths (.001 to .002) of an inch between the sleeve and the strainer.

In operation, with the upper cup 19 (FIG. 1) in its raised position (not shown) and the plunger 45 in its lowered position (also not shown), fruit, such as an orange F, is fed into the stationary lower cup 21 of the juice extractor 13. The upper cup 19 then moves downwardly into interdigitation with the lower cup 21, thereby squeezing the orange F on all sides and pressing it against the annular knife blade 37 which cuts a circular plug P out of the orange peel. At the same time the upper blade 23 cuts a plug P1 from the top of the fruit. The pressure then applied to the orange by the interdigitating cups 19 and 21 as they close, forces the plug P, and the juice, seeds and pulp of the orange down inside the strainer tube 39, the lower end of which is blocked by the plunger 45 whose axial passage 46 is closed by the solid extraction residue R (FIG. 1) of previously processed oranges. As the orange juice, pulp and seeds are pressed into the tube 39 by the descent of the upper cup 19, the plunger 45 moves upwardly, thereby reducing the effective volume of the strainer tube 39 and forcing the orange juice out through the windows 60 and through the perforations 40 into the collecting chamber 31. As the upper cup 19 approches its lowest position (not shown), and the plunger 45 approaches its highest position, which is slightly above that shown in FIG. 2, the seeds and the dry pulp, from which substantially all the juice has been extracted, are forced into the axial passage 46 in the plunger 45 and the juice separating stage is completed. Subsequently, the upper cup 19 and the plunger 45 return to their highest and lowest positions, respectively, where they are ready to begin the extraction of juice from another orange.

It should be particularly noted that, even when the plunger or orifice tube 45 approaches the uppermost position, shown in FIG. 3, the juice can still pass outwardly through the perforations of the strainer tube 39 since the windows 60 maintain communication between the perforations and the interior of the plunger 45. The plug P will, of course, have been forced to a position in the plunger below the lower edge of the windows. The long neck 48 of the insert is gradually tapered as shown in FIG. 2, to permit the plug P to move downwardly in the plunger orifice tube.

During the separation of the juice from the pulp and seeds, many of the fine fibers and membranes of the pulp are pressed against the perforated inner surface of the straining tube 39 and become caught in the perforations so that they hang partially out of the tube and partially within the tube. If these fibers are not removed from the inner surface of the tube and from the perforations, they will build up and mat thereon, thus clogging the perforations and causing the plunger to bind in the strainer tube 39. Any such buildup of fibers in the present device is prevented by the split rings 64 and 78. As the plunger 45 rises in the strainer tube 39, the knife edges 70 and 80 scrape the inner surface of the tube 39, removing any matted pulp therefrom and severing any fibers or membranes which may be caught in the perforations of the tube 39. It will be understood that the split rings are pressed outwardly against the inner surface of the tube 39 by the pressures created in the plunger when the plunger rises in the strainer tube.

It will be evident that, if the rings 64 and 78 wear they can easily be replaced. Also, if for some reason the window insert 57 breaks or becomes worn, it can be removed from the body portion 52 of the orifice tube by heating the epoxy adhesive to a temperature at which the adhesive loses its gripping power and permits the separation of the insert 57 from the body portion 52.

The strainer tube 39 may be made as a forging from 303 or 304 stainless steel. The inner surface of the tube is preferably built up with hard chrome plating to a thickness of approximately 0.006 to 0.008" and then honed to the desired internal diameter. The perforations 40 are drilled in the tube before the tube is chrome plated and said perforations have a diameter of approximately 0.040". The split rings 64 and 78 are produced from 17—4 precipitation hardening stainless steel which is chrome-plated and ground to size. The plunger body 52 and the insert 57 may be made of stainless steel.

The plastic sleeve, which may have an outer diameter of approximately 1.00" and a wall thickness of approximately 0.125", is assembled by stretching it slightly and sliding it along the plunger body 52 until it snaps into position in the recesses 54 and 92. When it has become worn, it can be replaced by cutting it away from the plunger or by expanding it and sliding it off the plunger.

In FIGURE 4 an embodiment of the orifice tube of the present invention is illustrated wherein the window-carrying portion 100 of a plunger 101 is formed from stainless steel bar stock integrally with the lower portion 102 of the plunger, rather than being secured thereto as in the embodiment of FIG. 2. The other parts of the apparatus are identical to the parts shown in FIG. 2 and accordingly, identical reference numerals are used in FIG. 4 to indicate parts that are identical in both views.

In FIGURE 5 a third embodiment of the orifice tube of the present invention is illustrated. The orifice tube 110 of this embodiment is substantially identical to that of FIGURE 4 in that it comprises an upper window-carrying portion 112 formed integral with a lower body portion 113. Upper and lower rings 64 and 78, respectively, which are identical to the rings 64 and 78 of the FIGURE 2 embodiment, are mounted on the window member 112.

The orifice tube 110 of FIG. 5 differs from that of FIG. 4 in that, instead of having a Teflon bearing sleeve, the orifice tube is provided with a Stellite sleeve 115 that is positioned in a recess 116 in the outer surface of the stainless steel body portion 113. The Stellite sleeve may be disposed on the body portion by spray metallizing, or it can be preformed as two semi-cylindrical members that are placed around the tube and welded together by use of a Stellite rod. In both arrangements, the surface of the Stellite sleeve is finished by grinding it to the desired external diameter. In its final form, the sleeve may have a wall thickness of approximately 0.020" when sprayed on the body portion 113.

From the foregoing description, it will be evident that the present invention provides an improved orifice tube that not only makes possible the maximum recovery of juice but also substantially decreases the amount of normal wear between orifice tubes and the strainer tubes in which they slide.

In the embodiment of FIGURE 1, the use of the split rings 64 and 78 reduces considerably the area of contact between the orifice tube and the strainer tube 39 while maintaining an efficient scraping engagement with the inner surface of the strainer tube. Also, the window insert 57 not only assures continuous communication between the inside of the orifice tube and the perforations in the strainer tube, but also, due to its adhesive connection to the body portion 45, provides a means whereby worn or broken window inserts and scraper rings can be replaced without replacing the long expensive body portion 52 of the tube. Similarly the use of removable split rings 64 and 78, rather than scrapers integrally formed on the window insert 57, makes possible the replacement of worn rings without replacing the insert 57.

While the embodiments of the orifice tube illustrated in FIGS. 1–5 have three window openings, it will be evident that any suitable number of openings may be provided since, in effect, all that is required is that at least one window opening be provided to establish communication between the interior of the orifice tube and the perforations in the strainer tube.

In one arrangement where three equi-spaced window openings were provided and the outer diameter of the orifice tube in the zone of the openings was 0.92 inch, each opening had a length measured axially of the tube of approximately 0.875 inch, and each of the three posts that separate the window openings had a width, measured in a plane normal to the radial plane of the tube that bisects the post, of approximately 0.1875 inch.

When the split bearing rings are used in a strainer tube having an internal diameter of 1 inch, the upper ring may have a length, measured axially of the orifice tube, of 0.625 inch and the lower ring may have a length of 0.500 inch when removably secured to an orifice tube having a 0.9375 inch outer diameter in the window-opening area of the tube.

The improved split rings and window-type orifice tube or plunger makes it possible to use strainer tube perforations 40 that are much smaller in diameter than those previously used. As a result, the strained juice is of much higher quality and the amount of pulp retrieved from the central passage of the plunger is greatly increased. The recovery of pulp is of course highly desirable since, when this material is washed, additional sugars are recovered.

While several embodiments of the orifice tube or plunger of the present invention have been described above, it will be understood that other embodiments may be arrived at without departing from the teachings of the present invention. Accordingly, the scope of the present invention must be considered to be limited only by the scope and proper interpretation of the appended claims.

Having thus described the invention, what is claimed as being new and for which Letters Patent is solicited is:

1. A plunger adapted for reciprocating movement in a perforated cylindrical strainer tube, said plunger comprising a tubular body member having relatively large window openings in the side wall thereof establishing communication between the interior of said body member and the perforations in the tube, and a pair of bearing rings removably secured to the exterior surface of said body member, one ring on each side of said window openings.

2. A plunger adapted for reciprocating movement in a perforated cylindrical strainer tube, said plunger comprising a tubular body member, a window insert removably secured to one end of said body member, said insert having a central opening communicating with the central opening of said tubular body member and having at least one window opening in a side wall of said insert establishing communication between the perforations in the strainer tube and the central opening of said insert, and a bearing member operatively connected to said insert on each side of said window opening, said inserts being in sliding engagement with the inner surface of the perforated strainer tube.

3. A plunger adapted for reciprocating movement in a perforated strainer tube, said plunger comprising an elongate cylindrical body member having at least one window opening formed in one end thereof establishing communication between the interior of said body member and the perforations of the strainer tube, and a pair of bearing members removably secured to said body member, one bearing member being disposed on each side of said window opening and in sliding engagement with the interior surface of the strainer tube.

4. A plunger adapted for reciprocating movement in a perforated strainer tube, said plunger comprising a tubular body member having at least one relatively large window opening establishing communication between the interior of said body member and the perforations in the strainer tube, split bearing means removably secured to said body member and in slidable engagement with the inner surface of the strainer tube, and a sleeve of plastic material secured to said body member for movement therewith and disposed in sliding engagement with the inner surface of the strainer tube.

5. A plunger adapted for reciprocating movement in a perforated strainer tube, said plunger comprising a tubular body member having at least one relatively large window opening establishing communication between the interior of said body member and the perforations in the strainer tube, split bearing means removably secured to said body member and disposed in slidable engagement with the inner surface of the strainer tube, and a bearing liner of Stellite formed on said body member and disposed in sliding engagement with the inner surface of said strainer tube.

6. A plunger adapted for reciprocating movement in a perforated strainer tube, said plunger comprising an elongate tubular body member having at least one window opening in one end thereof, bearing means secured to said body member adjacent said window opening and disposing in sliding engagement with the inner wall of the strainer tube, and a liner of Stellite formed by spraying Stellite on the exterior surface of said body member, the exterior surface of said liner being dimensioned to slidably engage the inner surface of the strainer tube.

7. A plunger adapted for reciprocating movement in a perforated strainer tube, said plunger comprising a tubular body member having at least one window opening establishing communication between the interior of said body member and the perforations in the strainer tube, bearing means secured to said body member and disposed in slidable engagement with the inner surface of the strainer tube, and a pair of semi-cylindrical Stellite members secured around said body member to form a bearing liner having an external diameter adapting said liner for slidable engagement with the inner surface of the strainer tube.

8. A plunger adapted for reciprocating movement in a perforated strainer tube that has an inner surface of chrome, said plunger comprising a tubular body member having at least one relatively large window opening in the side wall thereof establishing communication between the interior of said body member and the perforations in the strainer tube, and a pair of bearing rings removably secured to the exterior surface of said body member, one ring on each side of said window opening, each ring having an outer surface of chrome.

9. A plunger adapted for reciprocating movement in a perforated metallic strainer tube, said plunger comprising a tubular body member having at least one window opening adjacent one end thereof for establishing communication between the interior of said body member and the perforations in the strainer tube, split bearing means removably secured to said body member adjacent the window opening and in slidable engagement with the inner surface of the strainer tube, and a sleeve of plastic material having glass particles therein secured around said body member for movement therewith and disposed in sliding engagement with the inner metallic surface of the strainer tube.

10. A plunger adapted for reciprocating movement in a perforated metallic strainer tube, said plunger comprising a tubular body member having at least one window opening adjacent one end thereof for establishing communication between the interior of said body member and the perforations in the strainer tube, split bearing means removably secured to said body member adjacent the window opening and in slidable engagement with the inner surface of the strainer tube, and a sleeve of corrosion-resistant plastic material having graphite particles therein secured around said body member for movement therewith and disposed in sliding engagement with the inner metallic surface of the strainer tube.

No references cited.

WALTER A. SCHEEL, *Primary Examiner.*